2,929,741

METHOD FOR COATING GRAPHITE WITH METALLIC CARBIDES

Morris A. Steinberg, University Heights, Ohio, assignor to the United States of America as represented by the United States Atomic Energy Commission No Drawing. Application November 4, 1957
Serial No. 694,460

7 Claims. (Cl. 117—114)

This invention relates in general to methods for the coating and bonding of refractory carbides upon graphite surfaces and in particular to a method for producing such coatings using a dip coating technique.

With the emergence of the age of nuclear reactors, high speed missiles and aircraft and rocket engines in general, there has arisen a field of high temperature research and technology devoted to the development and use of refractory surfaces which remain stable at higher operating temperatures than heretofore employed. In addition to the high temperatures, such surfaces are subjected to oxidizing or reducing atmospheres, ionizing radiation, high pressures or vacuums, and other severe and unusual conditions which ordinary materials of construction will not withstand. Graphitic carbon is a material which satisfies many of the necessary requirements in this field. Structurally, graphite is satisfactory with tolerable mechanical stresses. It has additional, highly desirable, qualities for particular uses. The low density of graphite makes it valuable where weight is a consideration. The high melting or sublimation point or graphite and its characteristic high structural strength at higher temperatures permit its use where most other materials, including the common metals, are not satisfactory. The low neutron absorption cross section and adequate moderating capacity of graphite has resulted in widespread application in nuclear reactors and systems.

While graphite has desirable properties such as those enumerated above, the normal properties are inadequate in other respects. Graphite erodes and corrodes under the impact of high gas pressures and temperatures. Many chemicals react with graphite or are adsorbed in an undesirable manner which cannot be easily controlled. Several expedients have been employed to alleviate the difficulty. In nuclear reactors, for example, graphite moderator blocks have been contained within a non-reactive metal such as zirconium or aluminum to prevent absorption of or reaction with the coolant. In gas cooled reactors and especially mobile, lightweight compact reactors, this form of construction is not especially practicable due to bulk, low structural strength and other factors. Coated graphite may also be employed in producing crucibles, retort tubes and other high temperature structures. Most severe and stringent requirements are encountered in the high temperature nuclear reactor field, i.e., coatings on graphite moderators especially in the construction of single piece graphite cores, in high pressure, high temperature mobile gas cooled reactors.

A method has now been discovered for providing metallic carbide coatings on graphite structures so as to satisfy even the most stringent requirements. In accordance with the invention, the graphite structure is immersed in or otherwise contacted with a molten alloy comprising a low melting point metal having therein a refractory metal for an extended time at high temperatures to produce a refractory metal carbide film or coating on the surface of the graphite. The refractory metal content and time-temperature conditions during contact determine the coating thickness since the process is diffusion controlled. Subsequently, the graphite structure is withdrawn from the molten coating bath and adherent low melting point metal is evaporated from the surface by heating to a high temperature in a vacuum thereby completing carburization of the refractory metal to produce a tenacious uniform carbide coating.

Accordingly, it is an object of the invention to provide refractory coatings on graphite surfaces.

A further object of the invention is to provide metallic carbide coated graphite structures for use in high temperature erosive and corrosive environments.

Another object of the invention is to provide metallic carbide coated structures for use in high-temperature gas cooled nuclear reactors.

A still further object of the invention is to provide a method for producing refractory metal carbide coatings on the surface of a graphite shape by contact with a molten alloy of a low melting and a refractory metal.

Still another object of this invention is to provide a method for coating graphite with refractory metal carbides by immersion in a molten alloy including a refractory metal dissolved in a low melting metal and subsequent separation of the low melting metal from the coated surface.

One other object of this invention is to provide a method for coating graphite with refractory metal carbides by immersion in a molten alloy of a low melting point metal and a refractory metal and subsequently heating the graphite in a vacuum to vaporize the low melting point metal and to carburize further the refractory metal.

Other objects and advantages of the invention will become apparent by consideration of the following description.

Porous and dense graphite of any shape or of any commercial or reactor grades material and provided by conventional processes are suitable for treatment in accordance with the invention. For example, the graphite may be in the form of a block, tube, nozzle, bored nuclear reactor cores, etc. Reactor grade graphite contains less than 3 p.p.m. boron and equivalent amounts of other undesirable substances. The graphite should be reasonably free from surface contamination and flaws which might interfere with the coating procedure. In usual practice, the graphic shape is disposed in a crucible or equivalent container and fastened therein in such a way that it will not float when the more dense molten alloy is added. The crucible should also be free of all contamination which might in any way alter the purity of the final coating, and, in fact, should be composed of a material, such as graphite, which will not dissolve to an extent greater than a few parts per million in the molten alloy. The crucible assembly is then placed in a large induction or other enclosed furnace capable of heating to the required temperature.

Either prepared alloy or the components for producing such alloy is then disposed in the crucible in an amount necessary to provide the required molten alloy depth. The lower melting point metal component of the alloy will preferably be tin, but may also be another metal, as will be discussed hereinafter. A large number of refractory metals may be employed in the present process; however, a metal such as zirconium or niobium is selected for reactor purposes on the basis of high carbide melting point and low neutron absorption cross sections. The furnace is now closed off to the atmosphere, after first covering the crucible of molten metal to conserve heat and reduce evaporation, if desired, and the air in the system is gradually flushed therefrom with an inert gas such as argon. Frequently, it is convenient to remove portions of the air by evacuation, before blanketing the system with the inert gas, in order to assure outgassing of more adsorptive materials. Inert gas is generally bled through the system at a slow rate during the subsequent heating process. The pressure during firing is not critical and an inert gas pressure of 3 in. Hg has been found satisfactory.

Heating of the crucible is then initiated to melt the components or prepared alloy in contact with the surface. In usual practice the charge is heated to a temperature in the range of 1400-2100° C. for 1-8 hours, according to criteria set forth hereinafter. During this operation a refractory metal carbide film forms at the interface between the alloy and graphite, the thickness and characteristics of the film being dependent upon the aforementioned variables. The low melting point metal apparently does not react with the graphite to form a persistent carbide. When the desired time and temperature conditions are satisfied, the furnace is allowed to cool under a flow of inert gas. Subsequent steps depend upon the final form desired. For pure coatings the specimens may be simply removed before solidification and as much solvent metal and intermetallic material as possible wiped from the surface in order to simplify the subsequent step. Evaporation of the low melting point metal is conveniently effected in a high temperature induction or other vacuum furnace. For convenience, the coated article may be disposed in a refractory crucible, the furnace closed, evacuated and flushed as before and finally evacuated by continuous pumping. The furnace is heated up to a temperature sufficient to volatilize the low melting point metal, about 2300° C. in the case of tin. Most of the metal ordinarily condenses on the cooler parts of the furnace, but a cold trap should be provided in the pumping line to prevent clogging. Inasmuch as the vapor pressure within the furnace is an indicator of the volatilization process, heating should be continued until the pressure decreases to a low relatively constant value. The unit is allowed to cool under vacuum. When cool, an inert gas is bled into the system and the charge removed. As a result of the foregoing operations coatings of up to at least several hundred mils in thickness are uniformly produced which coatings cannot be dislodged from the graphite surface without destruction of the base surface.

The quality and type of carbide coatings will first of all depend upon the solvent metal and the type of content of refractory metal in the alloy. In practice, tin has been used almost entirely as the solvent metal because it forms few or no intermetallic compounds with the refractory metals of primary interest, namely zirconium, niobium and titanium. Tin in addition has a very low melting point, yet a boiling point sufficiently higher than the carburization point of many of the refractory metals of interest. Lead and bismuth have similar properties which enable them to also be used, and in general any metal with a low melting point may be used with a specific refractory metal where the respective properties and intermetallic combinations are known to be suitable. The refractory metals tungsten, tantalum, niobium, titanium and zirconium may all be used with the low melting metals, i.e., tin, lead and bismuth to provide alloys for use in providing carbide coatings in accordance with the invention. Other metals forming refractory carbides below the vaporization point of a given solvent metal may also be used, i.e., hafnium, molybdenum, beryllium, boron, vanadium, nickel, chromium and silicon, etc. The content of the refractory metal dissolved in the low melting point metal is not critical, but superior results in general are achieved when this value is below 20% and an optimum concentration is found to be in the range of 4-5% when tin is used individually with zirconium, niobium and titanium.

The actual reaction which takes place in every instance is apparently the overall chemical combination of a refractory metal with carbon to produce a metallic carbide, with or without intervening intermediate reactions. However, the overall mechanism by which coating takes place is not clear. Explanation is made more difficult by the fact that direct contact of carbon with molten refractory metals fails to produce carbide coatings of the same quality, if at all. The low melting point metal does not appear to enter into the reaction; however, the outward diffusion of carbon through the heated carbide layer on the graphite surface which forms at the initiation of the heating is postulated as being the rate controlling step, and hence could account for the manner in which the carbide layer is gradually built up over a period of time, i.e., the carbon molecules diffuse through the carbide coating on the surface of the graphite and are carburized when they come into contact with the molten metal solution of refractory metal.

The relationship between firing temperature, exposure time and the growth rate and thickness of the carbide coating cannot be ascertained with complete certainty due to uncertainties in the mechanism of formation. In general the growth is faster at higher temperatures, but for a given temperature the thickness increases initially over a period of several hours at a constantly decreasing rate, probably until such time as break discontinuities develop in the coating, at which time there is re-establishment of intimate contact between the reactant metal alloy and the graphite. For example, such a growth process has been established for zirconium carbide in the temperature ranges 1600-1800° C., 1800-2000° C., and 1900-2100° C., until in each instance the coating thickness exceeds about 40 microns at the end of two hours. At this point the growth rate increases markedly and at the end of four hours the coat may be as thick as 200 microns. It is believed that this break discontinuity is due to the accumulation of compressive stresses in the film which are relieved by the formation of microcracks at a certain stress level. The rate of growth of carbides is believed to be independent of the melt concentration, and is a characteristic which differs with each individual metallic carbide rather than being the same for all carbides. For example, for a given firing time, niobium and titanium coatings are thicker than that of zirconium.

Even though several coating theories may be needed to explain the manner in which the thicker coatings are formed, it should be appreciated that the question of adhesion as a function of the processing method and of the chemical and physical character of the graphite specimen is an exceedingly complicated one. Normally application of the process as herein described will result in adhesive, tenacious coatings at least as thick as 40-100 microns. But slight variations in the adhesion quality may or may not depend upon factors which can be controlled in a given circumstance. Some general observations may serve to illustrate this point. For example, coatings formed on convex surfaces appear to demonstrate a lesser degree of adhesion than those produced on concave surfaces. Exfoliation during processing occurs much more readily on the outer surface of ¾ in. diameter tubes than on the outer surface of ½ in. diameter tubes even though the tubes bores of the same dimensions in the two tubes are not distinguishable from the standpoint of adhesion. With respect to coating hardness, those carbide layers formed in the higher ranges of temperature approach theoretical hardness values while softer material is produced at lower temperatures. And, although the adhesion of different coats is so similar that quantitative measurements cannot be made, best adhesion is obtained with coats under 3 mils with somewhat less adhesion on the average as the coating thickness is increased.

In any event consistently highly satisfactory coating of a large variety of metallic carbides can be produced advantageously on graphite employing the alloy technique of the invention. Complex configurations may be coated to provide surfaces which are resistant to mechanical abrasion, erosion and chemical reaction with various media. Zirconium, niobium and titanium carbide coatings are satisfactory in usual reactor environments and especially in contact with various coolants or heat transfer agents such as $NH_3$, $CO_2$, $CO$, $N_2$, $O_2$ and others.

Further details of the invention are set forth in the following specific description of the operation of the process.

EXAMPLE

The following experiment was undertaken to provide graphite tubes coated with zirconium, niobium and titanium for neutronic reactor material studies. The tubes, 81 in number, were composed of commercially available near-reactor grade graphite (ATJ and CS grades) (10 p.p.m. boron), very fine in texture, without flaws, and had a uniform density of 1.75 g./cm.$^3$ and a total ash content of 0.2% by weight. All of the tubes were 18 in. long, 3/4 in. outside diameter, and 3/16 in. inside diameter and all surfaces were smooth. The solvent metal, tin, and the three coating metals, zirconium, niobium, and titanium, were all obtained from commercial sources. The tin was 99.975% pure, electrolytic grade. The zirconium and titanium were also electrolytic grade and of high purity. The niobium was also of high purity except that it contained 0.5% carbon which would not interfere with the results.

Firing of the graphite tubes in batches was accomplished in a vertical induction furnace adapted to be evacuated and blanketed with an argon atmosphere. A number of the tubes were placed in a graphite crucible at one time. A retaining disc held the tubes in an upright position. Generally enough molten tin was poured into the crucible to freeze the tubes in place. The refractory metal, in powder or lump form, was then added to give the desired alloy concentration based on crucible volume less the volume of the specimens. More molten tin was then added to cover the refractory metal charge. A graphite disc or pinning arrangement was then inserted to prevent floating of the specimen tubes. Finally tin was added to cover the disc or pins, and the crucible placed in a larger receptacle, also graphite, to prevent any leakage or overflow. This container was then placed in the induction heating vacuum furnace and the closed system was evacuated with a mechanical pump aided by an oil diffusion pump. A vacuum pressure of less than 10 microns was maintained with a system leak rate of less than 5 microns per minute. When these conditions were satisfied, pure argon gas was bled into the system to give about 3 in. Hg pressure. This procedure was then repeated two more times, and after the last evacuation an argon flow of about 15 cu. ft./hr. was established through the furnace volume at the same pressure. Heating was then initiated, full power being achieved in about 15 min. when desired. Various runs were made for each of the three refractory metals in concentrations of 2 to 20% by weight, and for various temperatures from 1400 to 2100° C. and for various lengths of time from 1 hour to 8 hours, the exact experimental conditions for each specimen tube being listed in the accompanying Tables 1, 2, and 3 concerning the zirconium, titanium and niobrium coatings, respectively.

Every effort was made to hold conditions such as heat-up rate, purity of atmosphere, and temperature constant for each run. However, only by the most careful scrutiny was it possible to obtain less than 25° C. variation between readings taken minutes apart. The gate valve which protected the sight glass was kept closed between temperature measurements, but sufficient vapor deposited on the glass in the time interval during which it was exposed to require that the glass be removed and wiped clean before every critical reading. These factors together with the high emissivity value for graphite having been taken into consideration, it seemed apparent that the temperature measurements were accurate within a probable error of ±50° C. For this reason most of the firing or soaking temperatures are stated as ranges of ±100° C. from the temperature of interest. Exposure time was calculated as the total expired time during which the specimens were held in the indicated temperature range.

When each run had been completed the unit was shut down and allowed to cool under an argon flow. Equipment limitations made it necessary that the specimen tubes be frozen in the alloy melt after the carburizing treatment. Although removing the specimens from the melt at reaction temperature would probably not have eliminated the necessity for the second, or tin removal step, it would have greatly simplified the overall process in that manual wiping and cleaning at 300 to 400° C. between firings could have been omitted from the procedure. Accordingly, the crucible charge from the firing step was removed from the furnace and heated to melt the tin matrix. The retainer disc or pins were removed enabling the specimens to be taken out of the reaction crucible. Specimens were then allowed to drain and were wiped free of as much tin and intermetallic material as possible. They were then placed several at a time into a clean graphite crucible which was in turn placed in batches into an induction furnace unit for sublimation of the tin.

To accomplish sublimation, the induction furnace was evacuated and flushed as before, adhering to the same conditions of pressure and leak rate. When the desired vacuum conditions had been achieved, namely, 10 microns' pressure, the unit was heated up to 2300° C. Pressure of the system normally increased with temperature, reaching an equilibrium point at about 2300° C. Most of the volatilized tin condensed on the upper cooler parts of the furnace and head, with the balance going into a cold trap. The unit was allowed to cool under vacuum. When cool, argon gas was bled into the system and the charge removed.

In an examination and analysis of the finished specimen tube coatings, cross sectional specimens were cut with a fine-toothed saw to prevent flaking or breaking away of the carbide layer. These specimens were then rough ground on a wet sander using 240 grit silicon carbide paper. The pieces were then either hand polished on emery papers, 1 through 3/0, or on silicon carbide paper, 400 and 600 grit. They were finished on a slow polishing wheel covered with microcloth impregnated with 1 micron diamond powder.

The adherence of the carbide layer was very good during polishing even though there was a great difference in hardness between the graphite and carbide layers. Adherence, continuity porosity and width of the carbide layer on both the inside and outside of the tubes was uniformly excellent on the thinner coats and quite good on most of the thicker coats up to at least 100 microns. In several instances the specimens were etched with a tin etching reagent consisting of 5% conc. nitric acid-90% methyl alcohol to differentiate between the tin coating and the carbide layer. However, in the majority of the specimens, the color difference between the graphite, carbide and tin was sufficient to provide easy identification.

The coating thickness was measured with a filar micrometer with at least 15 readings being taken on each specimen. They are reported in Tables 1, 2, and 3, referred to hereinabove, the thickness value being listed therein for each specimen tube. A microhardness study was carried out on some of the specimens with a Tukon hardness tester at loads of 200 grams with a Vickers indenter. Values are reported in Table 4 for representative specimens fired at different temperatures for each of the three types of coats.

*Table 1*

ZIRCONIUM CARBIDE COATINGS

| Specimen Number | Firing Temp. (° C.) | Firing Time, Hrs. | ZrC Film Thickness (microns) | Zr Content of Sn Alloy (Wt. Percent) |
|---|---|---|---|---|
| 509-90-53 | 1,800 | 0 | 13.6 | 5 |
| 509-79-46 | 1,800-2,000 | 0.42 | 19 | 2.4 |
| 509-86-55 | 1,800-2,000 | 0.65 | 16 | 2 |
| 509-74-41 | 1,800-2,000 | 0.75 | 23 | 2 |
| 509-75-42 | 1,800-2,000 | 0.75 | 19 | 2 |
| 509-72-39 | 1,800-2,000 | 1.0 | 28 | 2 |
| 509-71-38 | 1,800-2,000 | 1.0 | 28 | 2 |
| 509-73-40 | 1,800-2,000 | 1.5 | 30 | 2.5 |
| 509-67-36 | 1,800-2,000 | 2.75 | 42 | 2 |
| 509-69-37 | 1,800-2,000 | 2.75 | 42 | 5 |
| 509-78-45 | 1,800-2,000 | 3.0 | 72 | 2 |
| 509-80-47 | 1,800-2,000 | 3.25 | 74 | 2.3 |
| 509-25-22 | 1,900-2,100 | 1 | 29 | 2 |
| 509-26-22 | 1,900-2,100 | 1 | 33 | 5 |
| 509-6-1 | 1,900-2,100 | 1 | 28 | 5 |
| 509-27-22 | 1,900-2,100 | 1 | 34 | 20 |
| 509-17-20 | 1,900-2,100 | 2 | 43 | 2 |
| 509-18-20 | 1,900-2,100 | 2 | 38 | 5 |
| 509-19-20 | 1,900-2,100 | 2 | 42 | 20 |
| 509-31-24 | 1,900-2,100 | 2 | 40 | 5 |
| 510-24-1 | 1,900-2,100 | 4.0 | 135 | 5 |
| 509-14-18D | 1,600-1,800 | 4.0 | 20 | 2 |
| 509-14-18E | 1,600-1,800 | 4.0 | 18 | 5 |
| 509-14-18F | 1,600-1,800 | 4.0 | 15 | 20 |
| 509-34-25 | 1,600-1,800 | 8.0 | 15 | 2 |
| 509-35-25 | 1,600-1,800 | 8.0 | 18 | 5 |
| 509-36-25 | 1,600-1,800 | 8.0 | no coat | 20 |
| 509-45-29 | 1,600-1,800 | 8.0 | 18 | 2 |

*Table II*

TITANIUM CARBIDE COATINGS

| Spec. No. | Temp. Range (° C.) | Exposure Time (Hours) | Percent Ti in Melt | Coating Thickness (microns) | | |
|---|---|---|---|---|---|---|
| | | | | Arith. Aver. | Low Rdng. | High Rdng. |
| 509-28-22 | 1,900-2,100 | 1 | 2 | 74 | 68 | 86 |
| 509-88-57 | 1,900-2,100 | 1 | 2 | 141 | 119 | 156 |
| 509-20-20 | 1,900-2,100 | 2 | 2 | 47 | 42 | 54 |
| 510-25-2 | 1,900-2,100 | 1 | 5 | 67 | | |
| 509-29-22 | 1,900-2,100 | 1 | 5 | 100 | 87 | 110 |
| 509-11-15 | 1,900-2,100 | 2 | 5 | 131 | 99 | 180 |
| 509-21-20 | 1,900-2,100 | 2 | 5 | 150 | 130 | 160 |
| 509-12-16 | 1,900-2,100 | 4 | 5 | 111 | 89 | 140 |
| 509-30-22 | 1,900-2,100 | 1 | 20 | 104 | 88 | 132 |
| 509-22-20 | 1,900-2,100 | 2 | 10 | 180 | 160 | 210 |
| 509-48-30 | 1,600-1,800 | 1 | 2 | 37 | 32 | 43 |
| 509-92-58 | 1,600-1,800 | 1.17 | 2 | 41 | 33.5 | 49 |
| 509-42-27 | 1,600-1,800 | 2 | 2 | 31 | 26 | 37 |
| 509-14-18A | 1,600-1,800 | 4 | 2 | 38 | 34 | 45 |
| 509-37-25 | 1,600-1,800 | 8 | 2 | 50 | 46 | 54 |
| 509-49-30 | 1,600-1,800 | 1 | 5 | 32 | 28 | 28.6 |
| 509-93-58 | 1,600-1,800 | 1.17 | 5 | 54 | 45 | 63.5 |
| 509-43-27 | 1,600-1,800 | 2 | 5 | 33 | 29 | 38 |
| 509-13-17 | 1,600-1,800 | 4 | 5 | 200 | 170 | 230 |
| 509-38-25 | 1,600-1,800 | 8 | 5 | 61 | 46 | 75 |
| 509-50-30 | 1,600-1,800 | 1 | 20 | 35 | 31 | 39 |
| 509-94-58 | 1,600-1,800 | 1.17 | 20 | 42 | 34 | 54.6 |
| 509-44-27 | 1,600-1,800 | 2 | 20 | 30 | 26 | 39 |
| 509-39-25 | 1,600-1,800 | 8 | 20 | 53 | 48 | 57 |
| 509-63-35 | 1,300-1,500 | 1 | 2 | 6 | 5 | 7 |
| 509-53-31 | 1,300-1,500 | 4 | 2 | 6 | 4.8 | 7.6 |
| 509-58-33 | 1,300-1,500 | 8 | 2 | 12 | 11 | 16 |
| 509-64-35 | 1,300-1,500 | 1 | 5 | 8 | 5 | 12.6 |
| 509-54-31 | 1,300-1,500 | 4 | 5 | 5 | 3.9 | 5.9 |
| 509-59-33 | 1,300-1,500 | 8 | 5 | 11 | 10 | 16 |
| 509-65-35 | 1,300-1,500 | 1 | 20 | | | |
| 509-55-31 | 1,300-1,500 | 4 | 20 | No Coat | | |
| 509-60-33 | 1,300-1,500 | 8 | 20 | | | |

*Table III*

NIOBIUM CARBIDE COATINGS

| Spec. No. | Temp. Range (° C.) | Exposure Time (Hours) | Percent Nb in Melt | Coating Thickness (microns) | | |
|---|---|---|---|---|---|---|
| | | | | Arith. Aver. | Low Rdng. | High Rdng. |
| 509-23-22 | 1,900-2,100 | 1 | 2 | 57 | 53 | 61 |
| 509-15-20 | 1,900-2,100 | 2 | 2 | 52 | 48 | 55 |
| 510-26-3 | 1,900-2,100 | 1 | 5 | 108 | | |
| 509-24-22 | 1,900-2,100 | 1 | 5 | 41 | 36 | 52 |
| 509-16-20 | 1,900-2,100 | 2 | 5 | 76 | 67 | 85 |
| 509-46-30 | 1,600-1,800 | 1 | 2 | 16 | 14 | 19 |
| 509-40-27 | 1,600-1,800 | 2 | 2 | 27 | 21 | 36 |
| 509-14-18B | 1,600-1,800 | 4 | 2 | 28 | 22 | 33 |
| 509-32-25 | 1,600-1,800 | 8 | 2 | 40 | 33 | 51 |
| 509-47-30 | 1,600-1,800 | 1 | 5 | 70 | 56 | 93 |
| 509-41-27 | 1,600-1,800 | 2 | 5 | 207 | 190 | 244 |
| 509-14-18C | 1,600-1,800 | 4 | 5 | 68 | 61 | 75 |
| 509-33-25 | 1,600-1,800 | 8 | 5 | 48 | 36 | 60 |
| 453-5-73 | 1,500-1,700 | 3 | 2 | 32 | 30 | 36 |
| 509-61-35 | 1,300-1,500 | 1 | 2 | no coat | | |
| 509-51-31 | 1,300-1,500 | 4 | 2 | 19 | 16 | 23 |
| 509-56-33 | 1,300-1,500 | 8 | 2 | 23 | 22.6 | 25.6 |
| 509-62-35 | 1,300-1,500 | 1 | 5 | no coat | | |
| 509-52-31 | 1,300-1,500 | 4 | 5 | 19 | 16.9 | 22.2 |
| 509-57-33 | 1,300-1,500 | 8 | 5 | 26 | 21.6 | 28.8 |

*Table IV*

COMPARISON OF VICKERS HARDNESS NUMBER AS A FUNCTION OF FIRING TEMPERATURE

| Composition of Film | Reaction Temp. (° C.) | Coating Thickness (μ) | Load. gms. | Vickers Hardness No. |
|---|---|---|---|---|
| ZrC | 1,900-2,100 | 135 | 200 | 2574 |
| ZrC | 1,600-1,800 | 20 | 200 | 946 |
| ZrC | 1,600-1,800 | 18 | 200 | 1354 |
| TiC | 1,900-2,100 | 137 | 200 | 2620 |
| TiC | 1,300-1,500 | 12 | 50 | 1413 |
| TiC | 1,300-1,500 | 11 | 50 | 945 |
| TiC | 1,300-1,500 | 6 | 50 | 1740 |
| TiC | 1,300-1,500 | 8 | 50 | 1340 |
| TiC | 1,900-2,100 | 141 | 200 | 2128 |
| NbC | 1,900-2,100 | | 200 | 1866 |
| NbC | 1,600-1,800 | 68 | 200 | 1354 |
| NbC | 1,600-1,800 | 207 | 200 | 1267 |
| NbC | 1,300-1,500 | | 50 | 532 |
| NbC | 1,500-1,700 | 32 | 200 | 1200 |

While the invention has been disclosed with respect to several preferred embodiments, it will be apparent to those skilled in the art that numerous variations and modifications may be made within the spirit and scope of the invention and thus it is not intended to limit the invention except as defined in the following claims.

What is claimed is:

1. In a process for coating graphite with an adherent, continuous layer of metallic carbide, the steps comprising immersing said graphite in a molten solution containing up to 20% by weight refractory metal selected from the group consisting of zirconium, niobium, titanium, tungsten, tantalum, hafnium, molybdenum and beryllium dissolved in a low melting point metal selected from the group consisting of tin, lead and bismuth, and heating the graphite and said solution to a temperature above 1400° C. and below the boiling point of said low melting point metal to form said carbides on the surface of said graphite, and removing said graphite from said solution.

2. The process of claim 1 in which zirconium is used as the refractory metal and tin is used as the low melting point metal.

3. The process of claim 1 in which niobium is used as the refractory metal and tin is used as the low melting point metal.

4. The process of claim 1 in which titanium is used as the refractory metal and tin is used as the low melting point metal.

5. The process of claim 1 in which the graphite is further treated to remove the residual low melting point metal therefrom.

6. In a process for coating graphite with an adherent, continuous layer of a metallic carbide, the steps comprising immersing said graphite in a molten solution containing up to 20% by weight refractory metal selected from the group consisting of zirconium, niobium and titanium dissolved in tin, blanketing said solution with an atmosphere of an inert gas, heating said solution to a temperature above 1400° C. to form a carbide coating on the surface of said graphite piece up to 200 mils thick, removing the coated graphite from said solution, and heating said graphite in vacuum to a temperature above the vaporization point of said tin whereby said tin is volatilized.

7. In a process for coating graphite tubes with an adherent, continuous layer of a metallic carbide, the steps comprising immersing said graphite tube in a molten solution of up to 20% by weight refractory metal selected from the group consisting of zirconium, niobium and titanium dissolved in tin, blanketing said solution with an atmosphere of an inert gas, heating said solution for a period of time up to eight hours at a temperature above 1400° C. and below the boiling point of said tin to form a refractory carbide on the surface of said graphite tube up to 200 mils thick, removing said tube of coated graphite from said solution after the solution has cooled to 300–400° C., wiping the tube to remove some of the adherent tin, and heating said graphite tube in a vacuum to a temperature above the vaporization point of said tin whereby said tin is evaporated.

References Cited in the file of this patent

UNITED STATES PATENTS

| | | |
|---|---|---|
| 2,548,897 | Krull | Apr. 17, 1951 |
| 2,636,856 | Suggs et al. | Apr. 28, 1953 |
| 2,703,334 | Clough et al. | Mar. 1, 1955 |